US009747219B1

(12) United States Patent
Bashari et al.

(10) Patent No.: US 9,747,219 B1
(45) Date of Patent: Aug. 29, 2017

(54) ADDRESS REMAPPING FOR EFFICIENT USE OF DISTRIBUTED MEMORY

(71) Applicant: AMAZON TECHNOLOGIES, INC., Seattle, WA (US)

(72) Inventors: Noam Efraim Bashari, Shaar-Haamakim (IL); Ron Diamant, Albany, CA (US); Yaniv Shapira, Bet Itzhak (IL); Barak Wasserstrom, Mitzpe Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 15/053,994

(22) Filed: Feb. 25, 2016

(51) Int. Cl.
*G06F 12/10* (2016.01)
*G06F 3/06* (2006.01)
*G06F 13/16* (2006.01)
*G06F 13/40* (2006.01)

(52) U.S. Cl.
CPC ............ *G06F 12/10* (2013.01); *G06F 3/0604* (2013.01); *G06F 3/067* (2013.01); *G06F 3/0632* (2013.01); *G06F 13/16* (2013.01); *G06F 13/4068* (2013.01); *G06F 2212/1016* (2013.01)

(58) Field of Classification Search
None
See application file for complete search history.

(56) References Cited

U.S. PATENT DOCUMENTS

| 6,877,063 | B1* | 4/2005 | Allegrucci | G06F 12/0638 |
| | | | | 326/38 |
| 7,484,070 | B1* | 1/2009 | Walton | G06F 12/023 |
| | | | | 711/100 |
| 9,634,669 | B2* | 4/2017 | Rosselli | G06F 15/7867 |
| 2013/0326522 | A1* | 12/2013 | Mangano | G06F 13/1626 |
| | | | | 718/101 |
| 2014/0019686 | A1* | 1/2014 | Dong | G06F 12/1408 |
| | | | | 711/128 |
| 2015/0039848 | A1* | 2/2015 | Chun | G11C 29/42 |
| | | | | 711/202 |
| 2016/0048457 | A1* | 2/2016 | Hars | G06F 12/10 |
| | | | | 711/163 |
| 2016/0124851 | A1* | 5/2016 | Cho | G06F 12/0653 |
| | | | | 711/157 |
| 2016/0224474 | A1* | 8/2016 | Harriman | G06F 12/109 |
| 2016/0352337 | A1* | 12/2016 | Rosselli | H03K 19/0008 |

* cited by examiner

Primary Examiner — Kevin Verbrugge
(74) Attorney, Agent, or Firm — Blank Rome LLP

(57) ABSTRACT

An apparatus such as a system-on-a-chip includes memory that is distributed through multiple functional hardware circuits. Each functional hardware circuit includes memory, and each functional hardware circuit can be configured to have its memory used either by the respective functional hardware circuit or by the apparatus' master device (e.g., main processor). For those functional hardware circuits that are not needed for a given application, their memories can be repurposed for use by the master device. Related methods are also disclosed.

20 Claims, 6 Drawing Sheets

ADDRESS REMAPPING FOR EFFICIENT USE OF DISTRIBUTED MEMORY

BACKGROUND

Digital memory is used in numerous applications. Memory may be used for a variety of reasons such as to store executable code and/or data. Some electronic devices are space-constrained. An example of such an electronic device is a system-on-a-chip ("SoC") on which the various components comprising the SoC are formed on a single semiconductor substrate. To the extent such devices include memory, such memory often is static random access memory (SRAM). On chip SRAM generally provides fast access times, but may occupy considerable valuable real estate on a space-constrained device such as an SoC and for that, and other reasons, is expensive. Some space-constrained devices may use external dynamic random access memory (DRAM) instead of more expensive on-chip SRAM. External DRAM is a less expensive option, but generally has slower access times than on-chip SRAM.

BRIEF DESCRIPTION OF THE DRAWINGS

For a detailed description of various examples, reference will now be made to the accompanying drawings in which.

DETAILED DESCRIPTION

Figure 1:
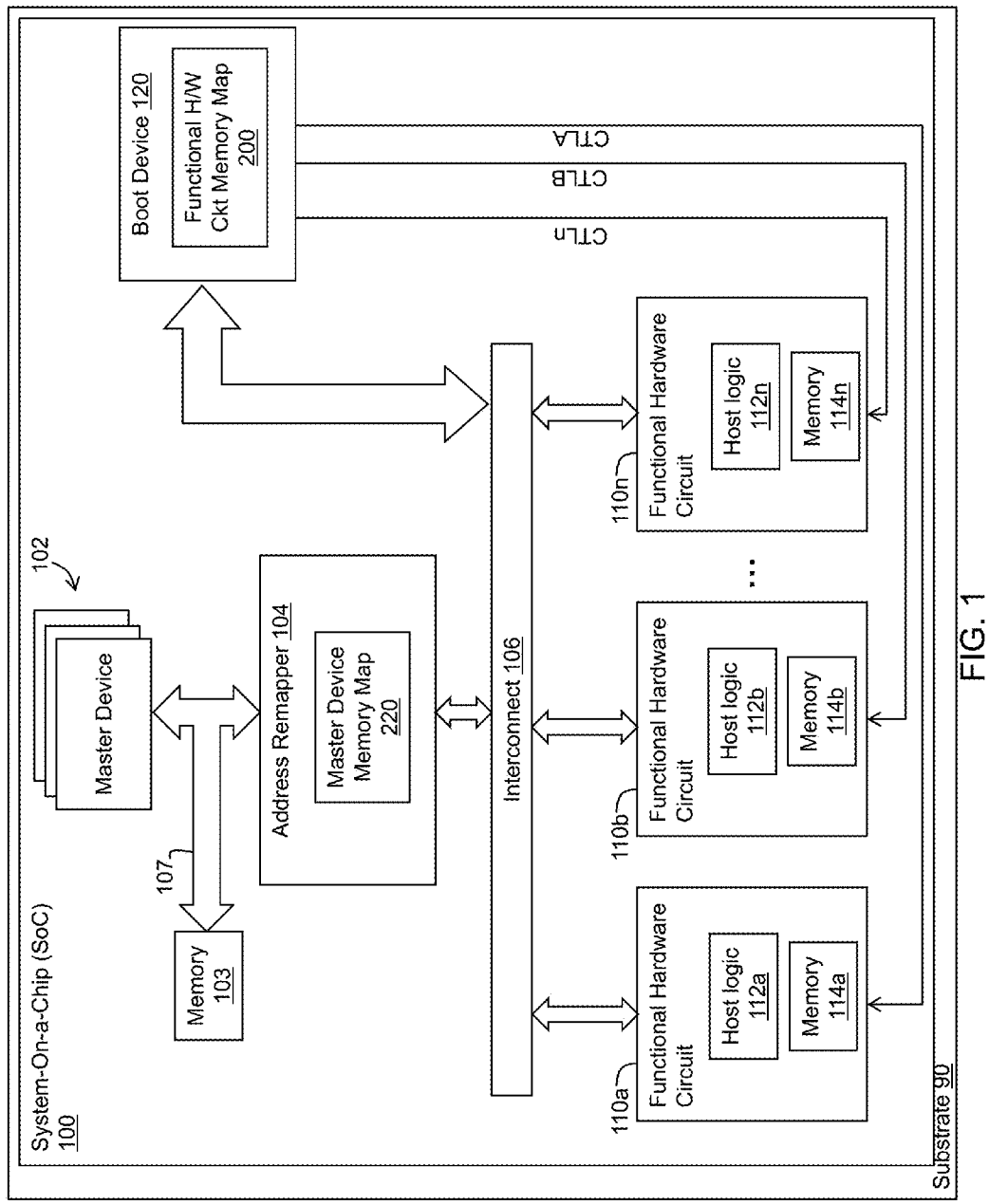
FIG. 1 shows a system containing distributed memory which can be used by various system devices in accordance with various examples.

Various embodiments of apparatus and methods are described herein that provide an efficient use of distributed memory in an electronic system. The electronic system may include one or more functional hardware circuits with each such functional hardware circuit providing particular functionality to the electronic system. Each of the functional hardware circuits may provide the same or different functionality. In one example, a functional hardware circuit within the electronic system may implement a network interface such as an Ethernet port, or other type of port protocol. The electronic system may also include one or more master devices such as a main processor that performs various functions as well and accesses and uses one or more of the functional hardware circuits if and when needed for the particular functions provided by each such functional hardware circuit. The master device may be provided on the electronic system itself (e.g., on the same semiconductor chip) or may be an external device (e.g., a Peripheral Component Interconnect Express (PCI-E) coupled to the electronic system through a network port. The master device may be a processor, a field programmable gate array or other type of device that can initiate memory operations to a memory device.

In some embodiments, each functional hardware circuit includes memory which can be used by host logic in the functional hardware circuit. In embodiments in which the electronic system includes multiple functional hardware circuits, multiple instances of such functional hardware circuit-specific memory are provided. That is, if n functional hardware circuits are included, then n memories are included across the various functional hardware circuits. In this way, the electronic system includes distributed memory—that is, memory devices that are distributed across and within each functional hardware circuit.

The electronic system, such as that described below, can be used in a wide variety of applications. To a certain extent, the electronic system may be a general purpose system that can be configured for use in a number of ways as desired by the system integrator or end user. While the memory of a given functional hardware circuit can be used by the host logic of the respective functional hardware circuit, not all of the functional hardware circuits that have memory in the electronic system are necessarily used. For example, for an electronic system that has five functional hardware circuits each with its own memory, some applications that use the electronic system may use only one of the five functional hardware circuits, while another application may use three of the five functional hardware circuits, while another application still may use all five of the functional hardware circuits. The same electronic system can be used in each of these applications and those functional hardware circuits that are not needed are simply not used. That one or more of the functional hardware circuits may not be used, however, provides an opportunity to repurpose the memory of the unused functional hardware circuit(s) for use, for example, by the electronic system's master device. The master device may use the memory in a variety of manners such as general purpose memory.

The particular functional hardware circuits that are not used may vary from application to application, and thus the particular memories and the amount of memory in functional hardware circuits that can be repurposed for use by the master device may vary as well from application to application. In some embodiments, the electronic system may include an address remapper that remaps the native addresses of the memories from the hardware functional circuits that are to be used by the master device instead of their respective hardware functional circuit. The native addresses are remapped by the address remapper to a different set of addresses that are used by the master device. The remapped addresses may all be in one consecutive set of memory addresses. When the master device is to access memory in the remapped memory range, the master device issues a memory operation that includes a memory address within the remapped memory range. The memory remapper receives the memory operation and remaps the operation's memory address to the corresponding native memory address. The memory remapper also may modify the memory address within the memory operation to include the native memory address, and may forward the memory operation to the hardware functional circuit that includes that particular native memory address.

By repurposing memory in otherwise unused hardware functional circuits, more efficient use can be made of the memory within the hardware functional circuits of the electronic system. More efficient use of the memory may negate the need for an external DRAM to support the electronic system's operation, or allow for the use of a smaller and cheaper external DRAM than might would otherwise be required.

FIG. 1 shows an example of such an electronic system. In the example of FIG. 1, the electronic system is implemented as a system-on-a-chip ("SoC") 100. The SoC 100 may comprise various components, such as those shown, which are formed on a common semiconductor substrate 90. In the example of FIG. 1, the SoC 100 may include one or more master devices 102, memory 103, an address remapper 104, an interconnect 106, and one or more functional hardware circuits 110a, 110b, . . . , 110n (collectively referred to herein as "functional hardware circuits 110"). The master device 102 may comprise any type of programmable processor capable of retrieving instructions from storage, executing the instructions and accessing memory 103 and/or memory 114 in one or more of the functional hardware circuits. Examples of such a processor include microprocessors, microcontrollers, etc. References are provided below to master device 102, but such references apply to any one of multiple master devices 102, as well as to two or more master devices in combination.

The master device 102, memory 103, and the functional hardware circuits 110 in this example are coupled together by various busses (e.g., bus 107), as well as the interconnect 106. The interconnect 106 may include conductive pathways for signals to traverse between the various components, storage queues to store data and messages pending their transmission across the interconnect to a destination location, switches, and other active logic. The address remapper 104 may include circuitry comprising transistors and other types of electrical components that may receive memory operations from the master device 102. Some of the master device memory operations may be modified by the address remapper 104 and forwarded through the interconnect 106 to one or more of the functional hardware circuits 110. The functional hardware circuits 110 also may be coupled through the interconnect 106 without involving the address remapper 104, such as for non-memory operations.

The memory 103 may be coupled to the master device 102 via bus 107 as shown which also may couple the master device 102 to the address remapper 104 and through the address remapper to the interconnect 106. In other embodiments, multiple buses may be included to couple together the master device 102, memory 103, and address remapper 104. For example, memory 103 may be coupled to master device 102 through one bus, and a different bus may be included to couple the address remapper 104 and/or interconnect 106 to the master device 102. Further, the memory 103 is shown as a separate component from master device 102, but in other embodiments, the memory 103 is included within the master device 102. In some embodiments, the memory 103 is used exclusively by the master device 102 (e.g., is a master device-dedicated memory).

While three functional hardware circuits 110 are shown in the example of FIG. 1, in other embodiments, any number of functional hardware circuits 110 can be included. Functional hardware circuits 110a, 110b, . . . , 110n include host logic 112a, 112b, . . . , 112n and memories 114a, 114b, . . . , 114n. Any host logic 112a, 112b, . . . , 112n may be referred to as host logic 112 and any of the memories 114a, 114b, . . . , 114n may be referred to as memory 114.

Memory 114 may comprise SRAM in some embodiments. Host logic 112 may include a processor that executes code to implement the function(s) desired for the respective functional hardware circuit. Each functional hardware circuit 110 is capable of performing at least one function. The functionality performed by all of the functional hardware circuits 110 may be the same across the various functional hardware circuits in some embodiments, while in other embodiments, some, but not all, of the functional hardware circuits 110 perform the same functionality. An example of a function that may be performed by the functional hardware circuits 110 includes operation as a network port. For example, a functional hardware circuit 110 may operate as an Ethernet port. Another example of the operation of a functional hardware circuit includes a data encryption engine. That is, the functional hardware circuit 110 may encrypt or decrypt data as requested by the master device 102.

The SoC 100 has a fixed number of functional hardware circuits 110 each functional hardware circuit configured to perform a particular function. The various functions that can be performed by the functional hardware circuits are intended to span the full range of what most or all system integrators or end users of the SoC 100 would potentially need. By fabricating and selling one version of the SoC, manufacturing and inventory control is fairly straightforward. However, because not all system integrators and end users may need to use all of the functional hardware circuits 110 on the SoC, one or more of the functional hardware circuits 110 may be unused. For example, if two of the functional hardware circuits 110 are implemented as Ethernet ports, but in a particular application, one Ethernet port is needed, the first Ethernet port (e.g., functional hardware circuit 110a) is used, but the second Ethernet port (e.g., functional hardware circuit 110b) is not used.

In accordance with various embodiments, any memory 114 in an otherwise unused functional hardware circuit 110 can be repurposed for use by the master device 102. Thus, each functional hardware circuit 110 is configurable to have its memory 114 selectively used either by the host logic 112 of the respective functional hardware circuit or by the master device 102. If used by the functional hardware circuit, the memory 114 is used to store data and/or executable that may be specific to the particular functionality performed by the functional hardware circuit. If used by the master device 102, the memory 114 may be used for any purpose.

A boot device 120 also is shown in FIG. 1 and may be part of the SoC 100. The boot device 120 may configure the SoC 100 based on, for example, data and/or commands provided to it by an external memory component coupled to the boot device or based on information from a master device 102. In the embodiment of FIG. 1, the boot device couples to interconnect 106. In other embodiments, the boot device 120 may be coupled via a different bus or different type of connection to one or more of the components of the SoC 100. In some embodiments, the boot device 120 (or other hardware logic component) also generates and asserts control signals to the functional hardware circuits 110. In the example shown, the boot device 120 asserts an individual control signal to each functional hardware circuit 110. The control signals are designated CTLA, CTLB, and CTLn, with control signal CTLA provided to functional hardware circuit 110a, control signal CTLB provided to functional hardware circuit 110b, and control signal CTLn provided to functional hardware circuit 110n. As will be explained below, each control signal configures the respective functional hardware circuit 110 so that its memory 104 is used by either the host logic 112 of the functional hardware circuit in an application in which the functional hardware circuit is used, or by the master device 102 in an application in which the functional hardware circuit is not otherwise used.

Figure 2:
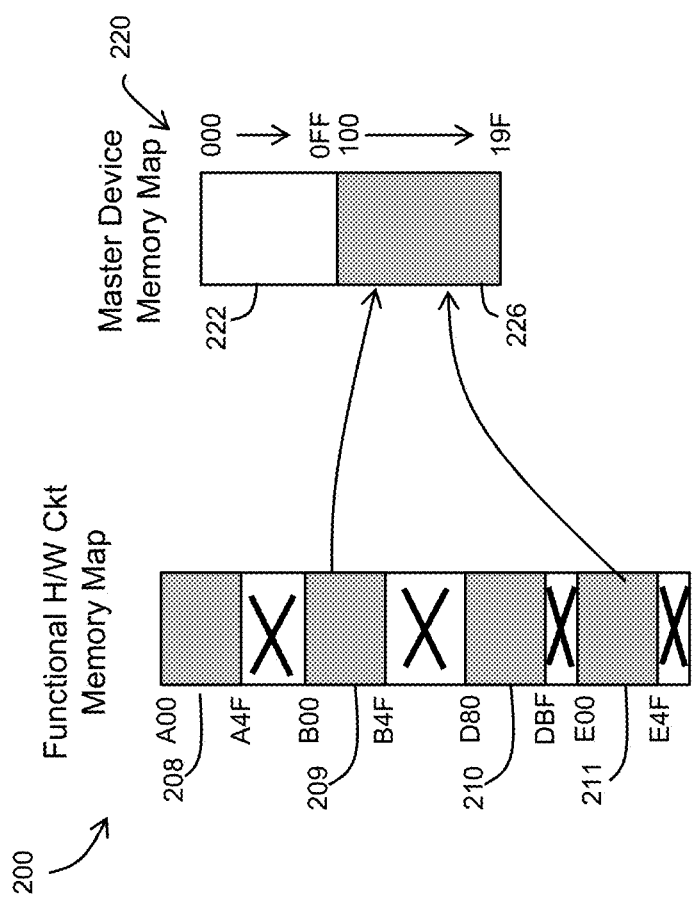
FIG. 2 illustrates the remapping of at least some of the native memory addresses of the distributed memory to a consecutive block of memory addresses for use by the system's master device in accordance with various examples.

Each of the memories 114 of the functional hardware circuits 110 may comprise a single memory device or multiple memory devices. Further, each memory 114 is accessed with a memory address that is within a range of memory ranges that is preassigned to that memory. The memory addresses that are preassigned to the memories 114 are referred to as "native" memory addresses. FIG. 2 shows an example of a functional hardware circuit memory map 200 and the mapping of various native memory addresses to addresses of a master device memory map 220 that are used by the master device 102. The functional hardware circuit memory map 200 includes native memory addresses that correspond to the various memories 114 of the functional hardware circuits 110. In one example, the functional hardware circuit memory map 200 includes or indicates the memory addresses or ranges of memory address as well as an identifier of the corresponding memories 114 to which the memory addresses map. In the example of FIG. 2, the functional hardware circuit memory map 200 includes four non-consecutive sets of memory addresses identified with shading. The first set of memory addresses 208 (A00h-A4Fh) and the third set of memory addresses 210 (D80h-DBFh) are assigned to respective memories 114 of functional hardware circuits 110 that are actively used during SoC operation. That is, the host logic 112 of those particular functional hardware circuits 110 is active and operational and accesses the memories 114 using the addresses within the addresses ranges.

The other two address ranges 209 (B00h-B4Fh) and 211 (E00h-E4Fh) in this example are preassigned to memories 114 of other functional hardware circuits that are not needed and thus not used in the particular application in which the SoC 100 is to be used. In accordance with various embodiments, their native memory addresses (B00h through B4Fh and E00h through E4Fh) are remapped to a different set of addresses as reflected in the master device memory map 220, which may be stored in, or otherwise accessible to, the address remapper 104. Native addresses from the two non-consecutive blocks of addresses B00h-B4Fh and E00h-E4Fh may be mapped to a single consecutive block 226 of addresses such as addresses 100h through 19Fh as shown in the master device memory map 220. Native address B00h maps to master device memory address 100h, native address B01h maps to master device memory address 101h, and so on. The other block 222 of addresses in the master device memory map 220 of FIG. 2 includes addresses of memory to which the master device 102 always has access (e.g., master device-dedicated memory 103). The non-shaded blocks of address in the functional hardware circuit memory map 200 (indicated with an "X") represent native address that are not assigned to any memories 114 in the functional hardware circuits 110.

Figure 3:
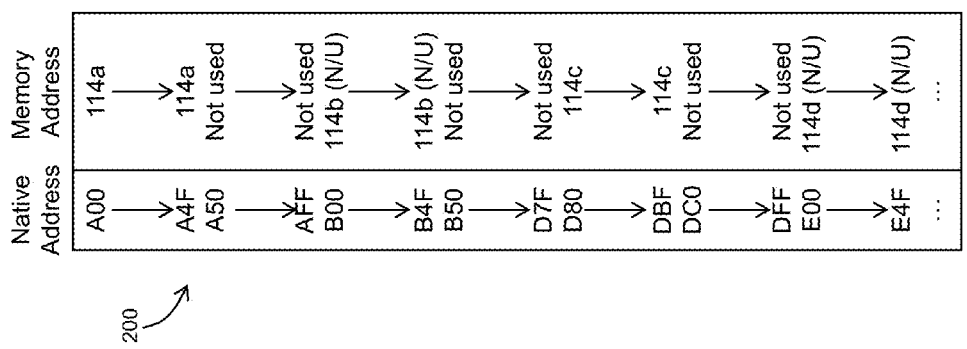
FIG. 3 illustrates an example of a functional hardware circuit memory map.

FIG. 3 provides an example of a functional hardware circuit memory map 200 consistent with the example shown in FIG. 2. The functional hardware circuit memory map 200 includes memory addresses starting at A00h and extending to E4Fh and beyond. Memory addresses in certain ranges are not used at all. Those memory address ranges include A50h-AFFh, B50h-B7Fh, and DC0-DFFh. The remaining native memory addresses are assigned to memories contained within the functional hardware circuits 110. Memory addresses A00h-A4Fh correspond to memory 114a in functional hardware circuit 110a. Memory addresses B00h-B4Fh correspond to memory 114b in functional hardware circuit 110b and are designated as "not used" (N/U) to indicate the corresponding functional hardware circuit is not to be used. Memory addresses D80h-DBFh correspond to a memory 114c in a functional hardware circuit 110c, and memory addresses E00h-E4Fh correspond to a memory 114d in an unused functional hardware circuit 110d.

Figure 4:
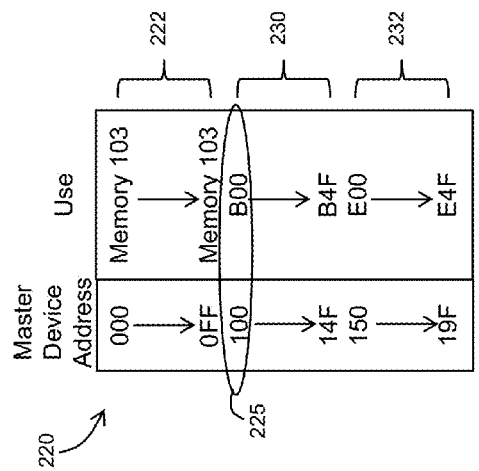
FIG. 4 illustrates an example of a master device memory.

FIG. 4 illustrates an example of the master device memory map 220 in which the range of master device memory addresses are listed along with their use. Master device memory addresses in the range of 000h through 0FFh are used for access to master device-dedicated memory 103. Master device memory addresses 100h through 14Fh are mapped to native memory addresses B00h-B4Fh as explained above. Similarly, master device memory addresses 150h-119Fh are mapped to native memory addresses E00h-E4Fh. The native memory addresses in the master device memory map in the example of FIG. 4 include a lower native memory address range 230 which includes native memory addresses in the range of B00h-B4Fh, and an upper native memory address range 232 which includes native memory addresses in the range of E00h-E4Fh. The base address of the upper native memory address range 232 is E00h which corresponds to a master device memory address of 150. In some examples, the master device memory map 220 may include the base address of the master device address range (000h in this example), the uppermost address of the addresses corresponding to the master device-dedicated memory (e.g., memory 103) or the size of the master device dedicated memory. Similarly, as indicated at 225 the master device memory map 220 may include the base address of the memory 114 to be accessible by the master device (e.g., 100h) which maps to a corresponding native base address (e.g., B00h).

When the master device 102 issues a memory operation (e.g., read, write, etc.) that targets a memory location at a memory address that falls within block 222 of addresses (e.g., master device memory addresses 000h-0FFh, that memory operation is provided to the master device memory 103. However, when the master device 102 issues a memory operation that targets a memory address within blocks 230 or 232 (e.g., master device memory addresses 100h-19Fh), the address remapper 104 remaps the memory operation's memory address with its corresponding address from the functional hardware circuit memory map 200 (native addresses in the range of B00h-B4Fh and E00h-E4Fh). In some embodiments, the remapping of the address may include replacing some or all of the original memory address from the memory operation with the remapped address. The determination of the replacement or modified address is explained below with respect to FIG. 7. The address remapper 104 then may forward the modified memory operation to the interconnect 106 which will forward the memory operation to the particular functional hardware circuit that includes memory having a native memory address range that includes the memory operation's modified memory address.

The memory 114 of each functional hardware circuit 110 may be accessed by the host logic 112 of the respective functional hardware circuit or by the master device 102. In some embodiments, the memory 114 is accessed either by the functional hardware circuit's host logic 112 or by the master device 102, but not by both. Whether a functional hardware circuit's memory 114 is to be used by the host logic or by the master device is determined apriori by the system designer and subsequently may be programmed into the boot device 120. The boot device 120 may include the functional hardware circuit memory map 200, which may be generated based on data and/or commands provided to it from an external memory device or from a master device 102. As illustrated above with regard to FIG. 3, the functional hardware circuit memory map 200 includes the native memory addresses of the memories 114 contained in the functional hardware circuits 110 and whether certain ranges of such native memory addresses are actually used by the functional hardware circuits.

The boot device 120 includes code that is executed by the master device 102 during initialization of the SoC 100, or the boot device 120 itself may execute code. In either the case, at least one of the functions performed by the boot device 120 is to program the master memory 220 in the address remapper 104. The boot device 120 may perform this operation by determining which native memory addresses of the functional hardware circuits 110 are not otherwise to be used and remapping those particular memory addresses into the master device memory map 220 for use by the master device 102. In one example, the boot device 120 may provide a list of native memory addresses to the address remapper 104 that are not going to be used by the functional hardware circuits' memories 114. The list may include one or more starting addresses of one or more ranges of address and the number of consecutive memory addresses in each range. The address remapper 104 then may assign otherwise unused master device memory addresses to the unused native memory addresses provided by the boot device to generate the master device map 220.

Figure 5:
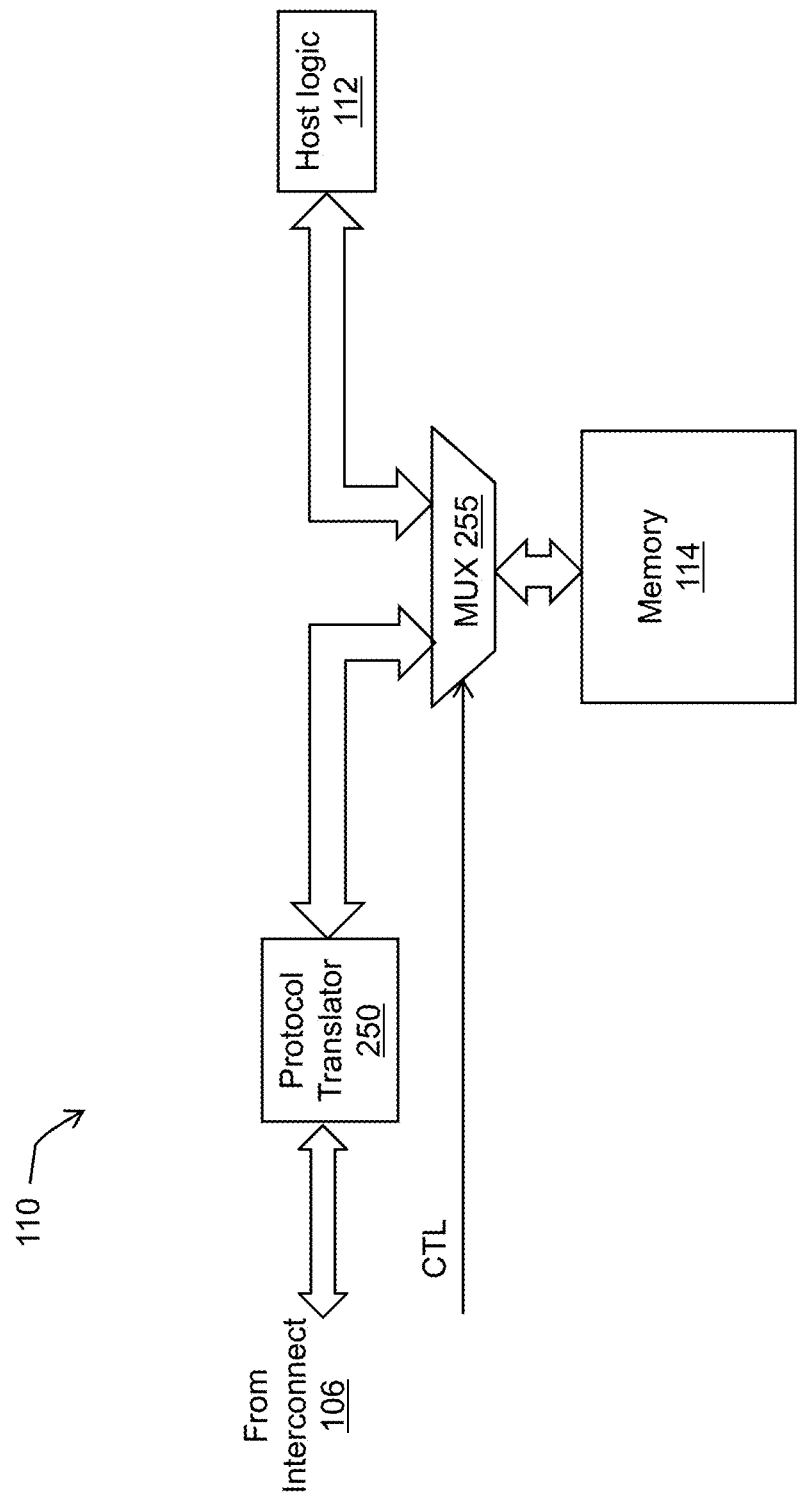
FIG. 5 illustrates a block diagram of a functional hardware circuit containing memory which selectively can be used by either the functional hardware circuit or repurposed for use by the system's master device in accordance with various examples.

FIG. 5 illustrates an example of an implementation of a functional hardware circuit 110. In this example, the functional hardware circuit 110 includes host logic 112, memory 114, a multiplexer 255, and a protocol translator 250. The host logic 112 may include electronic circuit components such as a processor, flip flops, registers, logic gates, etc. that perform one or more operations specific to that particular functional hardware circuit. Examples of the use of a functional hardware circuit includes a network port, a storage port (for connection to a storage device), an accelerator (e.g., security accelerator, error correction accelerator, etc.). The protocol translator 250 may be included as desired to translate packets received from the master device 102 via the interconnect 106 to a protocol that is appropriate for accessing the memory 114. For example, the master device 102 may access the content of memory 103 using one protocol (e.g., ACE, AXI, AHB, APB, or other protocol). The master device access requests thus comport with such a protocol even when the master attempts to access memory 114 of a functional hardware circuit 110 that does not employ the same protocol. The protocol translator 250 translates the access requests and return packets in accordance with the particular protocols used by the master device and functional hardware circuit. For example, if the memory space width is 32 bits and the master device 102 attempts to read a 128 bit line, the protocol translator 250 may hold the master request, send four read requests towards the memory 114, assemble a 128 bit line of read data from memory 114, and return the requested data back to the master device 102.

The multiplexer 255 (or other type of switch) provides access to the memory 114 by either the master device 102 or by the host logic 112. The control signal (CTL) may be asserted by the boot device 120 to control the state of the multiplexer 255. In one state, the multiplexer couples the host logic 112 to the memory 114, while in another state, the master device 102 is coupled to the memory 114 (through, for example, the interconnect 106 and protocol translator 250). In some embodiments, based on the functional hardware circuit memory map 200 in the boot device 120, the boot device may determine that a particular functional hardware circuit 110 is not to be used by the functional hardware circuit. Accordingly, the boot device 120 may assert the control signal to that functional hardware circuit to configure the multiplexer 255 (and thus the functional hardware circuit) to couple the SoC's master device 102 to the memory 114, rather than the host logic 112. In such embodiments, each functional hardware circuit 110 is configured independently by the boot device 120 to couple either the master device 102 or the respective host logic 112 to the functional hardware circuit's memory 114.

In some embodiments, a functional hardware circuit 110 may be configured to couple its memory 114 to one of the host logic 112 or master device 102 at different points in time. For example, during an initialization process, some or all of the functional hardware circuits 110 may be configured by the boot device 120 to give access to the memories 114 to the master device 102, but during subsequent operation of the SoC following the initialization process, one or more of the functional hardware circuits may be reconfigured by the boot device to couple the host logic 112 of such functional hardware circuits to the memories 114 instead of the master device. That is, the master device 102 may be able to use extra functional hardware circuit memory 114 during a defined period of time (e.g., initialization). The amount of functional hardware circuit memory 114 accessible by the master device 102 may be changed dynamically.

Figure 6:
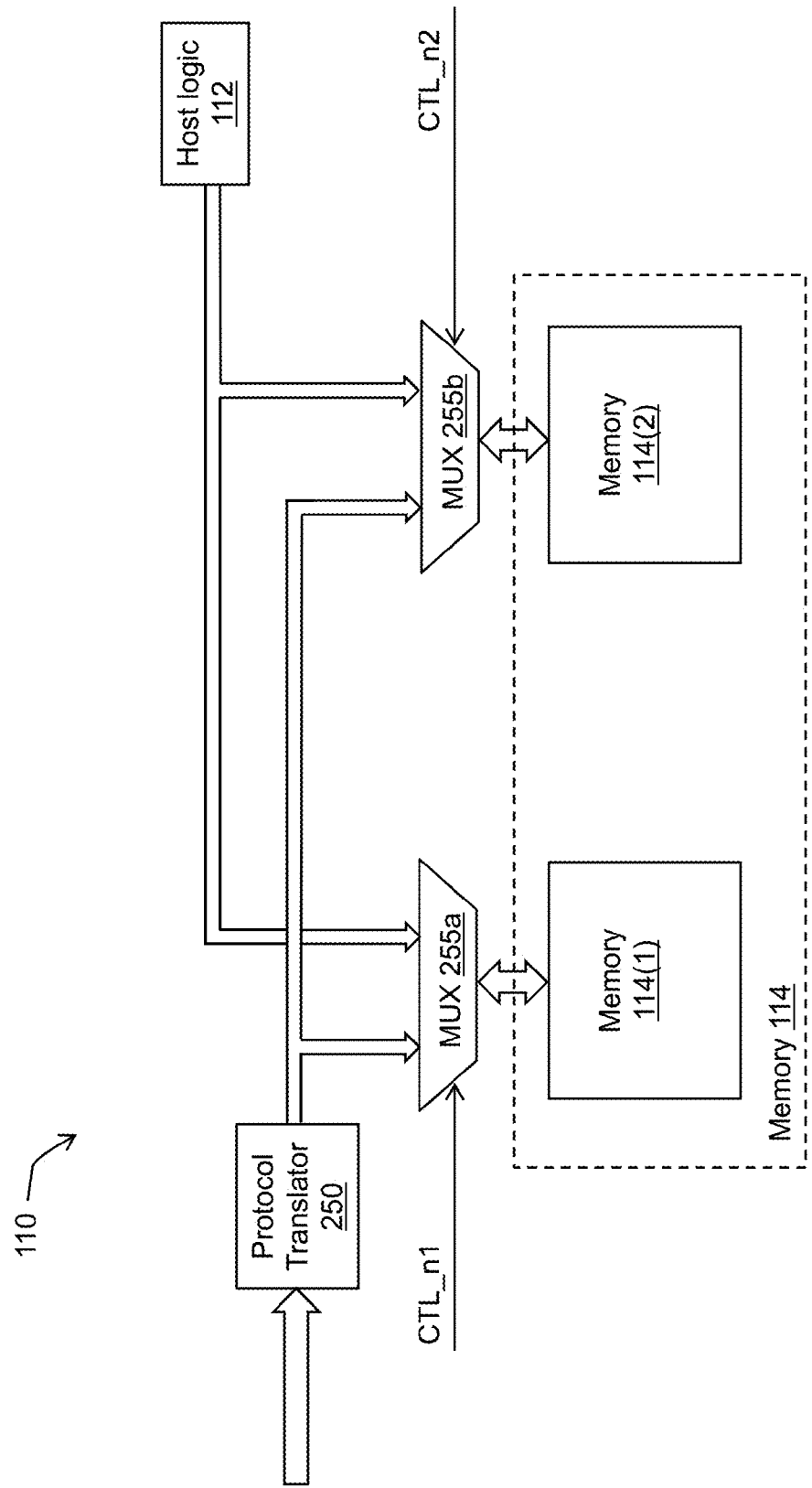
FIG. 6 shows block diagram of another embodiment of a functional hardware circuit which includes multiple memory devices which can be selectively assigned for use by either the system's master device or host logic internal to the functional hardware circuit.

FIG. 6 shows an example of a functional hardware circuit 110 in which the memory 114 includes multiple memory devices such as memory devices 114(1) and 114(2). Each memory device 114(1) and 114(2) provides a portion of the total memory 114 of the functional hardware circuit 110. A separate multiplexer may be included to provide independent access to each memory device. As shown, multiplexer 255a provides access to memory device 114(1) and multiplexer 255b provides access to memory device 114(2). Separate control signals (CTL_n1 and CTL_n2) may be asserted by the boot device 120 to configure the multiplexers of the functional hardware circuit. As such, one of the master device 102 and host logic 112 may be provided access to each memory device without regard to which device accesses the other memory device. For example, the multiplexers 255a and 255b may be configured to provide (a) master device 102 access to both memory devices, (b) host logic 112 access to both memory devices, (c) master device 102 access to memory device 114(1) and host logic 112 access to memory device 114(2), or (d) host logic 112 access to memory device 114(1) and master device 102 access to memory device 114(2). Further, the master device 102 may be coupled to only one of the memory devices 114(1), 114(2) while the other memory device remains unused by either the master device 102 or host logic 112.

Figure 7:
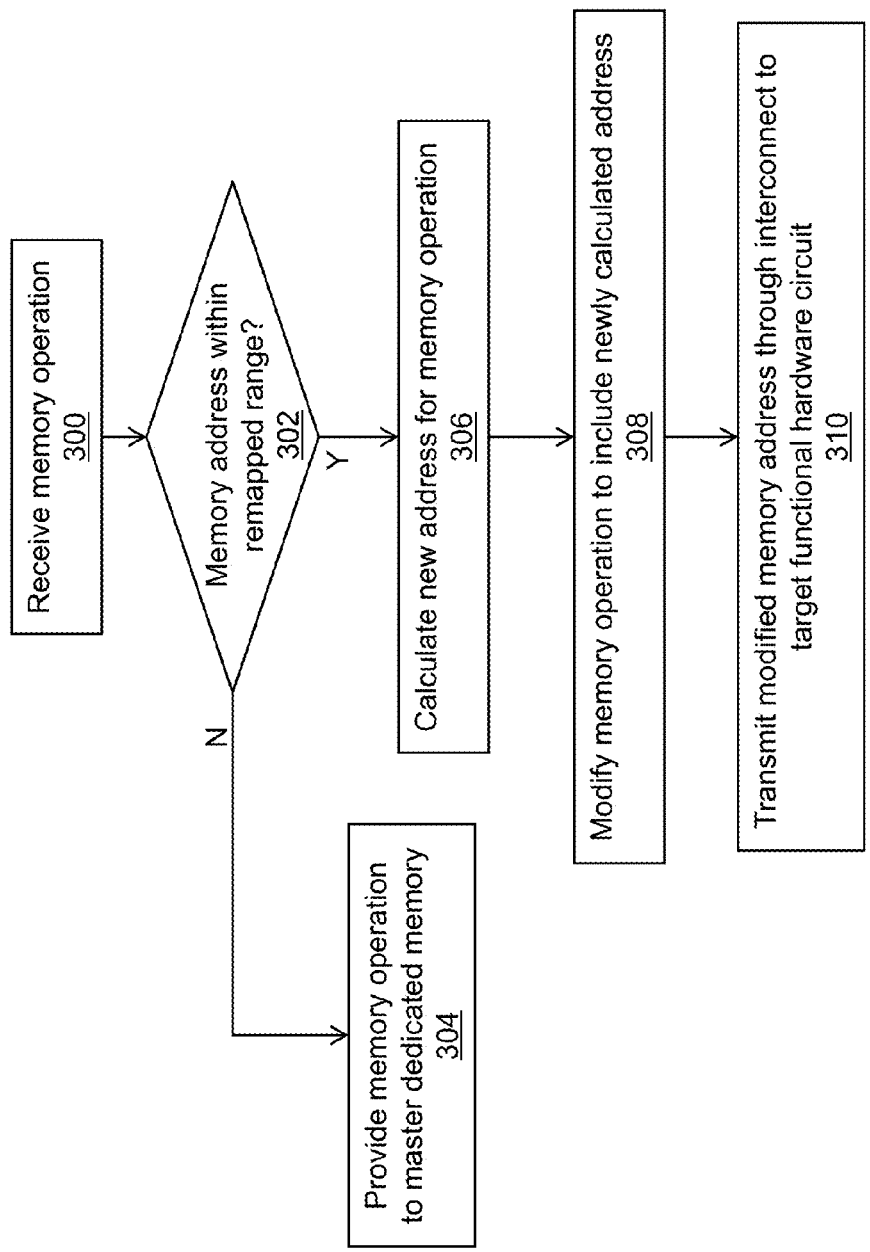
FIG. 7 shows a method in accordance with various examples.

FIG. 7 shows a method in accordance with various examples. The operations shown in the example of FIG. 7 may be provided in the order shown, or in a different order. Further, two or more of the operations may be performed concurrently, rather than sequentially.

At 300, the method includes receiving a memory operation. The memory operation may be generated by the master device 102 such as by executing an application on a processor. The memory operation may be for access to memory such as a write, read, etc. The memory operation includes a memory address that indicates the memory location targeted by the memory operation. For example, for a memory write operation, the memory address may specify the memory location to receive write data included in the write operation. For a memory read operation, the memory address may specify the memory location from which data is to be retrieved from memory and provided to the master device 102. The memory operation may be received from the master device 102 by the address remapper 104. In some embodiments, the address remapper 104 receives all memory operations from the master device 102 including memory operations that target memory 114 in the functional hardware circuits 110 as well as other memory (e.g., memory 103) associated with the master device 102.

At 302, the method includes determining whether the memory address specified in the memory operation is within the remapped address range that corresponds to memory 114 contained in a functional hardware circuit 110, or whether the address is within a range corresponding to master device memory (e.g., memory 103). This determination can be made by comparing the memory address to the addresses listed in the master device memory map 220. For instance, with regard to the example of FIG. 4, the memory remapper 104 determines whether the memory address in the memory operation is within the range of 000h to 0FFh or within the range of 100h to 19Fh.

If the memory address is within the former range (e.g., 000h-0FFh) indicative of a memory device dedicated for use by the master device 102, then at 304 the address remapper 104 provides the memory operation to the master-dedicated memory or otherwise causes the memory operation to be provided to such memory. The address remapper 104 in this case may not remap the memory address.

If, however, the memory address is within the latter range (e.g., 100h-19Fh), then at 306 in the method of FIG. 7, the memory remapper 104 calculates a new memory address for the memory operation. In some embodiments, the address remapper may calculate a new address based on the master device memory map 220. The memory address in the memory operation may include a base address and an offset, which when added to the base address form the memory address targeted by the operation. The address remapper may replace the base address with a base address of the native memory addresses of the functional hardware circuits and an appropriate offset. In the example of FIG. 4, the native memory base address may be B00h or E00h which is the lowest memory address within the native memory address ranges (usable by the master device) of the functional hardware circuit memory map 200 (FIG. 3). The new offset is calculated based on the native memory base address. For example, if the base address and offset target master device address 100h, then the replacement base address and offset determined by the address remapper is B00h and 0, respectively. If the base address and offset target master device address 14Fh, then the replacement base address and offset determined by the address remapper is B00h and 4F, respectively. The native memory base address is B00h in this example for all master device addresses that map to native memory addresses within the lower native memory range 230. If, however, the base address and offset target a master device address that corresponds to a non-consecutive range of native memory addresses, then the replacement base address is the native base address (E00 in the example of FIG. 4) and the offset is calculated as the difference between the master device memory address offset and the master device memory address that corresponds to the base address of the upper native memory address range. For example, for a master device base address of 000h and an offset of 160, the corresponding native memory address is within upper native memory address range 232. The native memory address determined by the address remapper 104 includes a base address of E00h, and the offset is calculated as 160-151, which equals 9 in this example.

At 308, the method includes modifying the memory operation to include the newly calculated native memory address. This action may be performed by replacing the master device base address and offset with a native memory base address and offset as calculated above. The address remapper 104 then may transmit or cause to be transmitted the modified memory operation across the interconnect 106 to the functional hardware circuit 110 that includes the memory 114 targeted by the base address and offset. The interconnect 106 may include a mapping of native memory addresses and functional hardware circuits 110 and route the memory operation to the correct hardware circuit accordingly.

The term "couple or "coupled" in this disclosure refers to a direct or indirect connection between two or more components. Thus, if a first device couples to a second device, that connection may be through a direct electrical connection or through an indirect electrical connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system-on-a-chip (SoC), comprising:
    an interconnect on a semiconductor substrate;
    a processor on the semiconductor substrate and coupled to the interconnect;
    a plurality of functional hardware circuits coupled to the interconnect, wherein each of the functional hardware circuits includes a respective memory and is configurable by a control signal to have the memory selectively accessed either by the functional hardware circuit or by the processor; and
    an address remapper on the substrate and operable, for each functional hardware circuit configured to have its memory used by the processor, to change an address of a memory operation generated by the processor to a different address that is preassigned to the memory of the functional hardware circuit.

2. The SoC of claim 1, wherein the plurality of functional hardware circuits include a first functional hardware circuit and a second functional hardware circuit, and wherein:
    the first functional hardware circuit is configured to have its respective memory used by the processor and not by the first functional hardware circuit; and
    the second functional hardware circuit is configured to have its respective memory used exclusively by the second functional hardware circuit.

3. The SoC of claim 1, wherein each functional hardware circuit includes respective host logic and a respective switch, and wherein the switch is configurable by the control signal to selectively provide access to the memory in the functional hardware circuit by the host logic in the functional hardware circuit or by the processor.

4. The SoC of claim 1, wherein the address remapper is operable to:
    determine that a memory address contained in the memory operation generated by the processor is within a memory map containing a block of consecutive memory addresses that correspond to the memories of any functional hardware circuit that has been configured to have its memory accessed by the processor;

change the memory address in the memory operation to a different memory address determined based on the memory map; and provide the memory operation with the different memory address to the interconnect.

5. The SoC of claim 1, wherein each of the functional hardware circuits is configurable by the control signal to have the memory of the respective functional hardware circuit exclusively accessed by the processor during a first phase of operation of the SoC and by the functional hardware circuit during a second phase of operation of the SoC.

6. An apparatus, comprising:
a master device;
a plurality of functional hardware circuits, each functional hardware circuit including memory, and wherein each of the plurality of functional hardware circuits is configurable to have its memory used by the respective functional hardware circuit, and wherein the functional hardware circuits are selectively configurable by control signals to operate either in a first state in which the memory of the respective functional hardware circuit is exclusively accessible by the functional hardware circuit, or in a second state in which the memory of the respective functional hardware circuit is accessible by the master device and not by the functional hardware circuit; and
an address remapper coupled to the master device and to the plurality of functional hardware circuits, wherein the address remapper is operable to modify an address in a memory operation based on a master device memory map that maps first memory addresses to native memory addresses preassigned to memory in the functional hardware circuits.

7. The apparatus of claim 6, further comprising a boot device that is operable to program the master device memory map based on a functional hardware circuit memory map, wherein the functional hardware circuit memory map indicates which native memory addresses are assigned to functional hardware circuit memories but not used by the respective functional hardware circuits.

8. The apparatus of claim 6, wherein each functional hardware circuit includes host logic and a switch, and wherein the switch is configurable by a control signal to selectively provide access to the memory in the functional hardware circuit to either the host logic or the master device.

9. The apparatus of claim 6, wherein each functional hardware circuit includes a plurality of memory devices, a corresponding plurality of switches, and host logic, and wherein each switch is configurable by a control signal from the boot device to selectively provide access to its corresponding memory device by either the host logic or the master device.

10. The apparatus of claim 6, wherein a first set of the control signals configures a first plurality of the functional hardware circuits to operate in the second state during a first phase of a power cycle operation, and wherein a second set of control signals configures one of the first plurality of functional hardware circuits to operate in the first state at a subsequent time.

11. The apparatus of claim 6, wherein:
the native memory addresses of the memories of the functional hardware circuits that are configured to have their memories used by the master device comprise non-consecutive memory addresses; and
the master device memory map, to which the native memory addresses of the functional hardware circuits that are configured to have their memories used by the master device are mapped, comprises only consecutive memory addresses.

12. The apparatus of claim 6, further comprising a common semiconductor substrate on which the master device, plurality of functional hardware circuits, and address remapper are provided.

13. The apparatus of claim 6, wherein the master device includes a processor or a field programmable gate array.

14. A method, comprising:
for each of a plurality of functional hardware circuits containing memory, selectively configuring the respective functional hardware circuit to cause the memory of the respective functional hardware circuit to be accessed either by the functional hardware circuit or, instead of the functional hardware circuit, by a master device;
determining whether a memory address in a memory operation received from the master device is within a remapped memory address range;
for a memory address that is within the remapped memory address range, calculating a new memory address for the memory operation based on a first memory map;
modifying the memory operation based on the new memory address to produce a modified memory operation; and
transmitting the modified memory operation to a functional hardware circuit of the plurality of functional hardware circuits that includes memory targeted by the modified memory operation.

15. The method of claim 14, further comprising, for a memory address that is not within the remapped memory address range, transmitting the memory operation to a master device-dedicated memory without modifying the memory operation.

16. The method of claim 14, further comprising programming the first memory map during an initialization process to indicate the remapped memory address range.

17. The method of claim 14, further comprising, based on a second memory map, programming the first memory map to indicate the remapped memory address range.

18. The method of claim 17, wherein the second memory map indicates which memory addresses of memories in functional hardware circuits are not to be used by their respective functional hardware circuit, and wherein programming the first memory map includes configuring the first memory map to include memory addresses of those functional hardware circuits that are not to be used.

19. The method of claim 14, wherein configuring each functional hardware circuit comprises receiving a control signal.

20. The method of claim 14, wherein a first functional hardware circuit of the plurality of hardware circuits includes a plurality of memory devices, and wherein configuring the first functional hardware circuit includes receiving a control signal so that one memory device of the plurality of memory devices is accessed by the functional hardware circuit and another memory device of the plurality of memory devices is accessible by the master device instead of the first functional hardware circuit.

* * * * *